(12) United States Patent
Werner et al.

(10) Patent No.: US 8,960,342 B2
(45) Date of Patent: Feb. 24, 2015

(54) SWING-OUT COOLERS AND COOLING FANS

(75) Inventors: Gregory K. Werner, Durango, IA (US);
David R. Didelot, Asbury, IA (US);
Karl G. Heine, Dubuque, IA (US);
Denis J. Montocchio, Dubuque, IA (US); David D. Latham, Dubuque, IA (US)

(73) Assignee: Deere & Company, Moline, IL (US)

( * ) Notice: Subject to any disclaimer, the term of this patent is extended or adjusted under 35 U.S.C. 154(b) by 822 days.

(21) Appl. No.: 13/046,510

(22) Filed: Mar. 11, 2011

(65) Prior Publication Data

US 2012/0211292 A1 Aug. 23, 2012

Related U.S. Application Data

(60) Provisional application No. 61/445,478, filed on Feb. 22, 2011.

(51) Int. Cl.
*B60K 11/06* (2006.01)
*B60K 11/04* (2006.01)
*B23P 11/00* (2006.01)

(52) U.S. Cl.
CPC ............ *B60K 11/04* (2013.01); *B23P 11/00* (2013.01); *B60K 11/06* (2013.01); *B60W 2300/125* (2013.01); *B60W 2300/50* (2013.01)
USPC ...... 180/68.1; 29/890.03; 180/68.4; 180/68.2; 180/69.2; 165/41

(58) Field of Classification Search
None
See application file for complete search history.

(56) References Cited

U.S. PATENT DOCUMENTS

| 1,648,804 A | 11/1927 | Griese |
| 2,253,438 A | 8/1941 | Lutz |
| 3,297,080 A | 1/1967 | Williams et al. |
| 3,334,704 A | 8/1967 | Gehrke et al. |
| 3,404,732 A | 10/1968 | Mork |
| 3,757,853 A | 9/1973 | Daman |
| 3,834,478 A | 9/1974 | Alexander et al. |
| 3,837,149 A | 9/1974 | West et al. |
| 3,844,369 A | 10/1974 | Schroeder et al. |
| 4,066,119 A | 1/1978 | Stedman |
| 4,160,487 A | 7/1979 | Kunze et al. |
| 4,287,961 A | 9/1981 | Steiger |
| 4,541,645 A | 9/1985 | Foeldesi |

(Continued)

FOREIGN PATENT DOCUMENTS

| EP | 1098073 | 5/2001 |
| FR | 2808870 | 11/2001 |

(Continued)

OTHER PUBLICATIONS

Volvo Artculated Hauler "A25D/A30D"as early as Feb. 18, 2011, also can be found at www.http://www.volvo.com/constructionequipment/na/en-us/products/articulated-truck/volvo-articulated-truck.htm, (7 pgs.).

(Continued)

*Primary Examiner* — J. Allen Shriver, II
*Assistant Examiner* — Hilary L Johns
(74) *Attorney, Agent, or Firm* — Faegre Baker Daniels LLP

(57) ABSTRACT

A vehicle is provided having at least one swing-out cooling assembly. A method of assembling the at least one swing-out cooling assembly on the vehicle is further provided.

24 Claims, 12 Drawing Sheets

(56) References Cited

U.S. PATENT DOCUMENTS

| | | | |
|---|---|---|---|
| 4,696,361 A | 9/1987 | Clark et al. | |
| 4,757,858 A | 7/1988 | Miller et al. | |
| 4,942,187 A | 7/1990 | Kawata et al. | |
| 5,009,262 A | 4/1991 | Halstead et al. | |
| 5,386,873 A | 2/1995 | Harden, III et al. | |
| 5,490,572 A | 2/1996 | Tajiri et al. | |
| 5,492,167 A | 2/1996 | Glesmann | |
| 5,522,457 A | 6/1996 | Lenz | |
| 6,105,660 A | 8/2000 | Knurr | |
| 6,129,056 A | 10/2000 | Skeel et al. | |
| 6,523,520 B1 | 2/2003 | Chatterjea | |
| 6,732,784 B2 | 5/2004 | Dion | |
| 6,871,697 B2 | 3/2005 | Albright et al. | |
| 6,880,656 B2 | 4/2005 | Pfusterschmid et al. | |
| 6,966,355 B2 | 11/2005 | Branham et al. | |
| 7,128,178 B1 * | 10/2006 | Heinle et al. | 180/68.4 |
| 7,134,518 B2 | 11/2006 | Arai et al. | |
| 7,370,690 B2 | 5/2008 | Rasset et al. | |
| 7,401,672 B2 | 7/2008 | Kurtz et al. | |
| 7,426,909 B2 | 9/2008 | Keane et al. | |
| 7,445,100 B2 * | 11/2008 | Ronk et al. | 192/3.58 |
| 7,753,152 B2 | 7/2010 | Nakae et al. | |
| 7,950,443 B2 | 5/2011 | Rasset et al. | |
| 8,037,963 B2 | 10/2011 | Nishimura et al. | |
| 8,186,751 B2 | 5/2012 | Davisdon et al. | |
| 8,230,957 B2 | 7/2012 | Braun et al. | |
| 8,276,650 B2 | 10/2012 | Martin et al. | |
| 8,317,889 B2 | 11/2012 | Kobayashi et al. | |
| 2005/0211483 A1 | 9/2005 | Pfohl et al. | |
| 2006/0219451 A1 | 10/2006 | Schmitt | |
| 2006/0289143 A1 | 12/2006 | Tallon | |
| 2007/0007061 A1 | 1/2007 | Meyer et al. | |
| 2008/0135209 A1 * | 6/2008 | Lowe et al. | 165/77 |
| 2009/0038775 A1 | 2/2009 | Leconte | |
| 2009/0078394 A1 | 3/2009 | Weatherup | |
| 2010/0181127 A1 | 7/2010 | Braun | |
| 2012/0285757 A1 | 11/2012 | Atarashi et al. | |

FOREIGN PATENT DOCUMENTS

| | | |
|---|---|---|
| GB | 2184700 | 7/1987 |
| GB | 2355700 A | 5/2001 |
| JP | 09011761 A | 1/1997 |
| JP | 10266967 A | 10/1998 |
| JP | 2001012244 A | 1/2001 |
| JP | 200230693 | 1/2002 |
| JP | 2003146089 | 5/2003 |
| JP | 2003159932 | 6/2003 |
| JP | 2003193509 A | 7/2003 |
| JP | 2003291662 A | 10/2003 |
| JP | 2004278379 | 10/2004 |
| JP | 2006183399 | 7/2006 |
| WO | WO2004099581 | 11/2004 |

OTHER PUBLICATIONS

Brochure, *G/GP-Series Graders*, John Deere, 40 pages, available at http://www.deere.com/en_US/docs/construction/motor_graders/DKAGGDR.pdf, accessed on Jul. 6, 2013.

* cited by examiner

SWING-OUT COOLERS AND COOLING FANS

CROSS REFERENCE TO RELATED APPLICATION

This application claims priority from U.S. Provisional Patent Application Ser. No. 61/445,478, entitled "SWING-OUT COOLERS AND COOLING FANS," filed Feb. 22, 2011, the disclosure of which is hereby expressly incorporated by reference herein in its entirety.

BACKGROUND AND SUMMARY OF THE DISCLOSURE

The present disclosure relates generally to a vehicle having a cooling system and, more particularly, to a vehicle including a swing-out cooling system.

Typically, engine systems for both highway and off-highway vehicles include a cooling unit, or heat exchanger, capable of cooling the engine cooling fluid (e.g., coolant), transmission oil, engine oil, etc. For off-highway vehicles, the cooling system may include multiple cooling units in a compact configuration in order to minimize any impact on the size and weight of the vehicle. Additionally, by providing a compact cooling system, there are less constraints on the operator when servicing the vehicle. As such, stacked cooling units are known to provide a compact cooling system for off-highway vehicles.

Over time, cooling units may accumulate debris from the air and the road which decreases the efficiency of the cooling system. Therefore, the cooling units require periodic cleaning and maintenance. However, the stacked cooling unit configuration may make it difficult to clean both sides of the cooling units and may further limit access to the engine.

Some cooling units may fold out from the vehicle in order to provide access to both sides of the cooling unit and the engine. However, such cooling units may rotate or fold out horizontally, thereby requiring the operator to either reach across the cooling unit to access the engine or support the cooling unit above the operator. Furthermore, it may be necessary to use tools to rotate the cooling unit, thereby making removal or rotation of the cooling unit cumbersome and time-consuming.

An illustrative embodiment of the present disclosure includes a vehicle including a chassis, a plurality of ground-engaging members operably coupled to the chassis, and an engine supported by the chassis and cooperating with the plurality of ground-engaging members to move the vehicle. The illustrative embodiment further includes at least one cooling assembly positioned adjacent to the engine and including at least one cooling panel that is configured to receive a fluid and at least one fan that is configured to direct air across the cooling panel to cool the fluid. The fan is configured to pivot outwardly relative to the at least one cooling panel. The at least one cooling panel is configured to pivot outwardly relative to the engine to expose the engine.

Another illustrative embodiment of the present disclosure includes a vehicle including a chassis, a plurality of ground-engaging members operably coupled to the chassis, and an engine compartment coupled to the chassis and housing an engine. The exemplary vehicle further includes at least one cooling assembly coupled to the engine compartment. The cooling assembly includes an air propelling member, a first cooler, and a second cooler. The first and second coolers are configured to receive a fluid and the second cooler is intermediate the first cooler and the engine. Each of the air propelling member, the first cooler, and the second cooler are pivotable from a closed position to an open position. The first cooler is intermediate the second cooler and the air propelling member when in the closed position. The air propelling member is configured to pivot relative to the first cooler.

The present disclosure further includes a method of assembling at least one cooling system on a vehicle. The method includes the step of positioning at least one heat exchanger adjacent to an engine. The at least one heat exchanger is configured to pivot away from the engine about a first axis. The method further includes the step of coupling a fan to the at least one heat exchanger with a hand-operable coupler such that the at least one heat exchanger is intermediate the engine and the fan.

Additional features and advantages of the present invention will become apparent to those skilled in the art upon consideration of the following detailed description of the illustrative embodiment exemplifying the best mode of carrying out the disclosure as presently perceived.

BRIEF DESCRIPTION OF THE DRAWINGS

The foregoing aspects and many of the intended advantages of this disclosure will become more readily appreciated as the same becomes better understood by reference to the following detailed description when taken in conjunction with the accompanying drawings.

Figure 1:
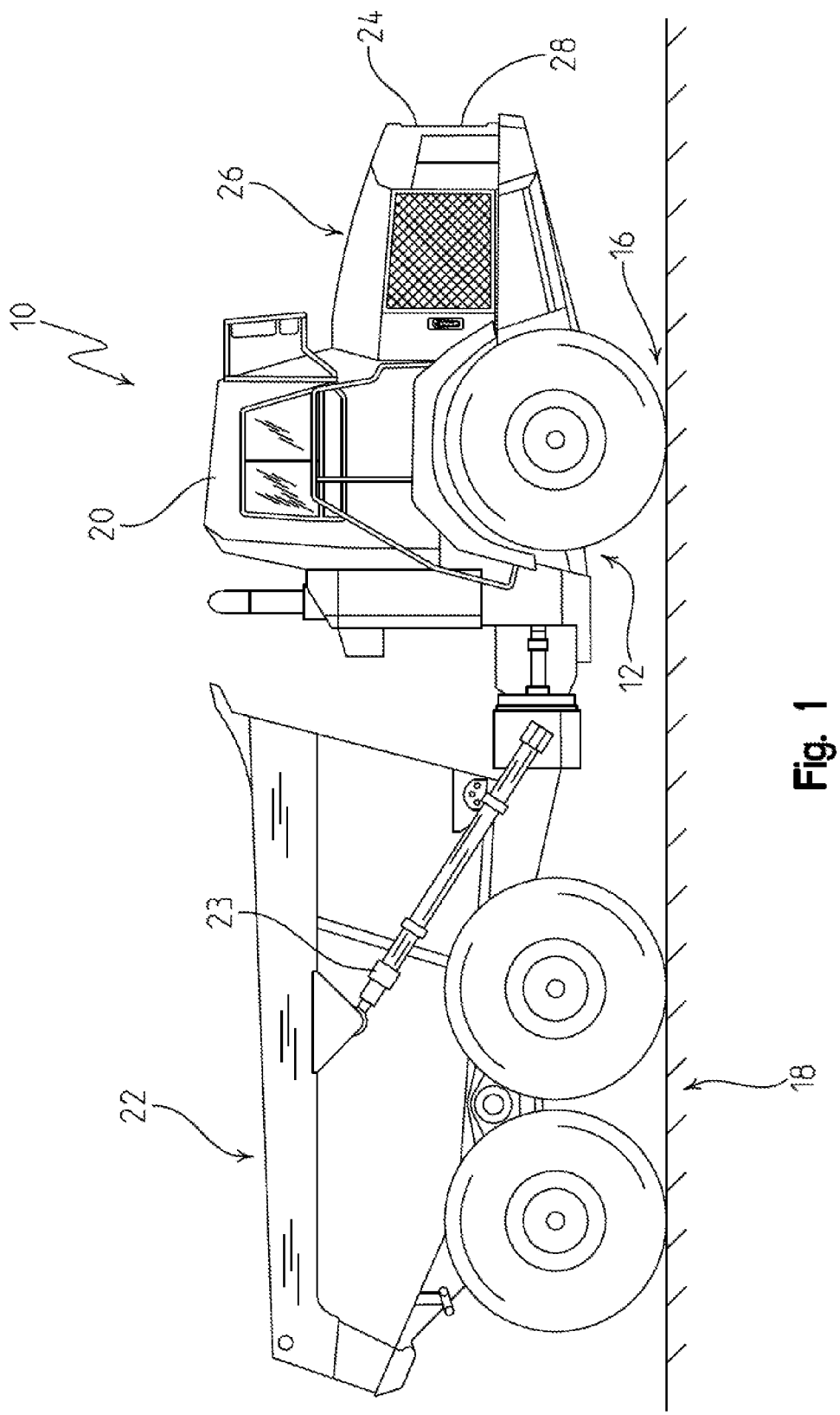
FIG. 1 is a side elevational view of a vehicle, illustratively, a dump truck.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 2:
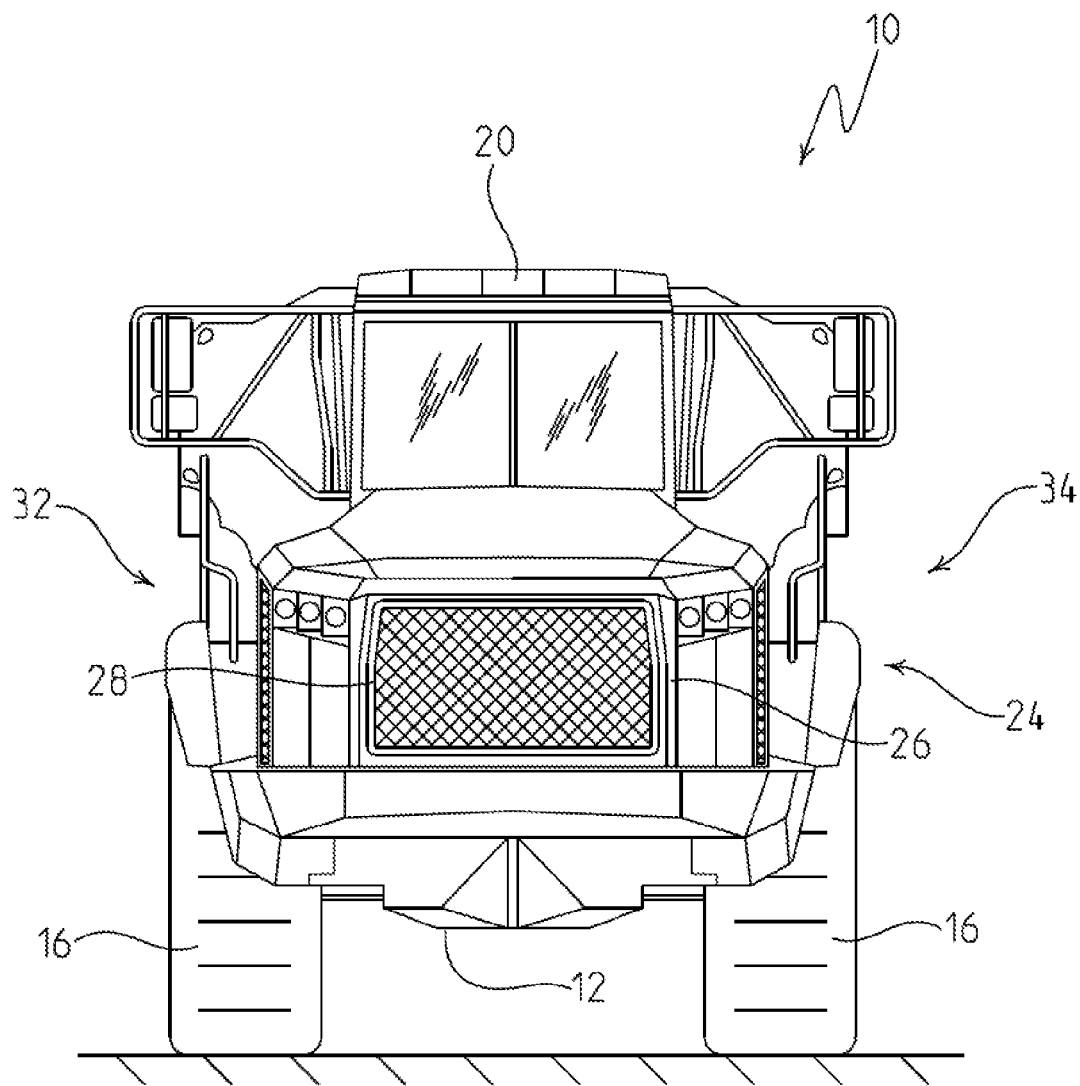
FIG. 2 is a front elevational view of the dump truck of FIG. 1.
Figure 3:
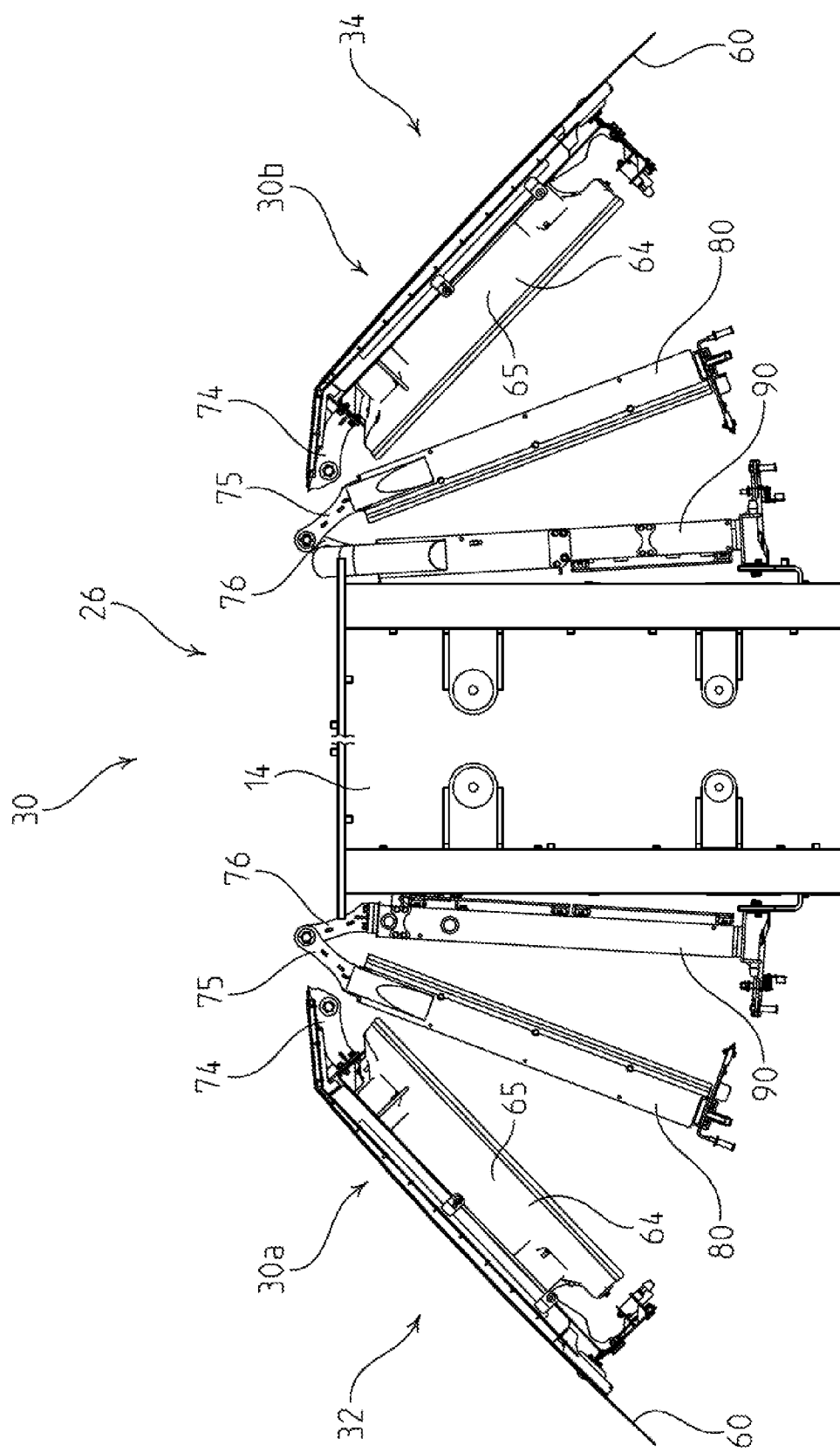
FIG. 3 is a bottom plan view of an engine compartment of the dump truck of FIG. 1, including an engine positioned intermediate a cooling system.

Referring to FIGS. 1-3, a construction or engineering vehicle is provided in the form of an articulated dump truck 10. Although the vehicle is illustrated and described herein as dump truck 10, the vehicle may be in the form of a tractor, a bulldozer, a motor grader, an excavator, a crawler, or another agricultural or utility vehicle, for example. Dump truck 10 includes a chassis 12, an engine 14, and a ground-engaging mechanism, illustratively, front wheels 16 and rear wheels 18. It is also within the scope of the present disclosure that the ground-engaging mechanism of dump truck 10 may include belts or tracks, for example. In use, engine 14, in cooperation with a transmission (not shown), drives front wheels 16 and rear wheels 18, causing dump truck 10 to propel across the ground. Engine 14 may be a combustion engine or an electric engine including an electric generator and at least one electric motor. For example, the electric generator and electric motor may cooperate with engine 14 and the ground-engaging mechanism to move dump truck 10.

Dump truck 10 of FIG. 1 also includes an operator cab 20 coupled to chassis 12 to house and protect the operator of dump truck 10. Operator cab 20 may include foot pedals, a steering wheel, joysticks, monitors, and other controls (not shown) for operating dump truck 10.

The illustrative embodiment of dump truck 10 of FIG. 1 further includes a work tool in the form of a dump or haul body 22. Other vehicles contemplated in this disclosure may include suitable work tools, such as blades, forks, tillers, and mowers. Dump body 22 is moveably coupled to chassis 12 for carrying and/or dumping dirt and other materials. At least one hydraulic cylinder 23 may be provided to operate dump body 22. The operator may control the movement of dump body 22 using joysticks or other controls located within operator cab 20.

FIGS. 2 and 3 show a front end 24 of dump truck 10, including operator cab 20, front wheels 16, and an engine compartment 26 positioned forward of operator cab 20. Alternative embodiments of the vehicle may be configured to support engine compartment 26 rearward of operator cab 20. Engine compartment 26 may be supported by chassis 12 and comprised of a plurality of support members forming a frame (not shown). Engine compartment 26 houses the transmission, engine 14, and at least one heat exchanger, shown as a cooling system 30. Illustratively, engine 14 cooperates with a first cooling assembly 30a and a second cooling assembly 30b to decrease the temperature of fluids, such as transmission oil, hydraulic oil, turbo-charged air, axle oil, and/or cooling fluid (e.g., coolant). As such, cooling system 30 prevents engine 14 from overheating during operation of dump truck 10. Cooling assemblies 30a, 30b include many similar features and as such, like features are identified with like reference numerals herein. Additionally, any reference and description provided for one of cooling assemblies 30a, 30b may be understood to be applicable to the other of cooling assemblies 30a, 30b, unless otherwise specified.

Referring to FIG. 3, a bottom view of cooling system 30 is shown. Illustratively, cooling assemblies 30a, 30b are positioned along exterior sides of engine compartment 26. For example, cooling assemblies 30a, 30b are positioned along opposing sides of engine compartment 26 with engine 14 being intermediate cooling assemblies 30a, 30b. Cooling assembly 30a is illustratively shown along a right side 32 of dump truck 10 and cooling assembly 30b is illustratively shown along a left side 34 of dump truck 10, where "right" and "left" are taken from the perspective of the operator inside operator cab 20. However, cooling assemblies 30a, 30b may be configured along other sides of engine compartment 26, for example, cooling assemblies 30a, 30b may be coupled to a front side 28 of front end 24 (FIG. 2).

Figure 4:
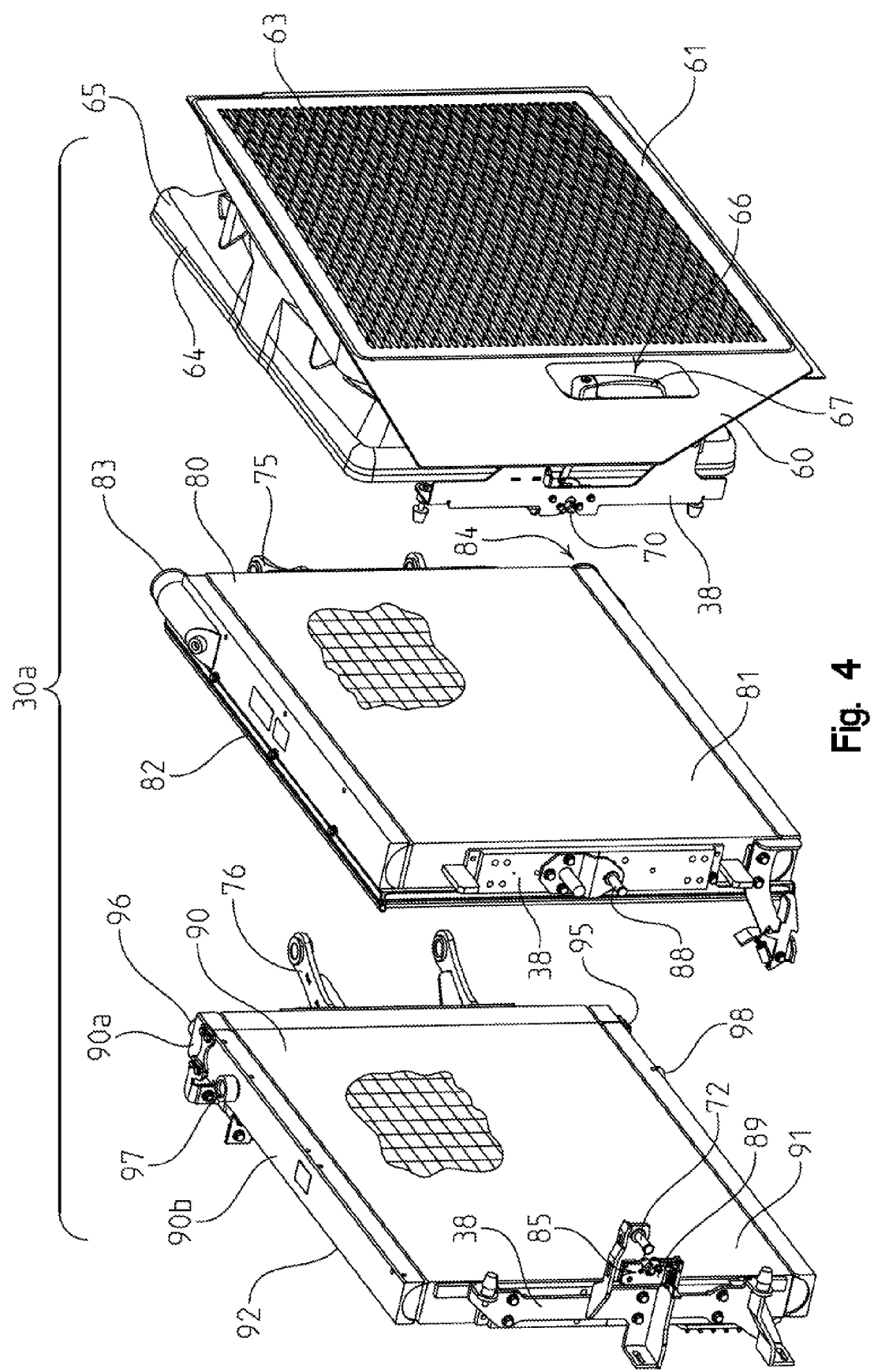
FIG. 4 is a rear exploded perspective view of one side of the cooling system of FIG. 3.

FIG. 4 shows cooling assembly 30a of cooling system 30. Illustratively, cooling assembly 30a includes a door 60, an outer cooling panel 80, and an inner cooling panel 90. Cooling assembly 30b also includes a door 60, an outer cooling panel 80, and an inner cooling panel 90, as shown in FIG. 3. Cooling assemblies 30a, 30b may include more or less than two cooling panels, or heat exchangers, depending on the size and configuration of dump truck 10. Exemplary cooling panels 80, 90 may be in a parallel, stacked arrangement to accommodate the limited space available in engine compartment 26 and at front end 24 of dump truck 10. Additionally, outer panel 80 may be intermediate inner panel 90 and an air propelling mechanism, illustratively a fan 64, coupled to door 60. Fan 64 may include a hydraulic motor (not shown) and a shroud 65. Door 60 is positioned externally to engine compartment 26 and along right side 32 of dump truck 10, while fan 64, outer panel 80, and inner panel 90 each are positioned within engine compartment 26. A frame assembly 38 of cooling system 30 is used to couple door 60, outer panel 80, and inner panel 90 to each other. Inner panel 90 may be adjacent to engine 14 and frame assembly 38 may be used to couple inner panel 90 to the frame of engine compartment 26 and/or chassis 12. Illustratively, inner panel 90 represents the heat exchanger nearest to engine 14.

Figure 5:
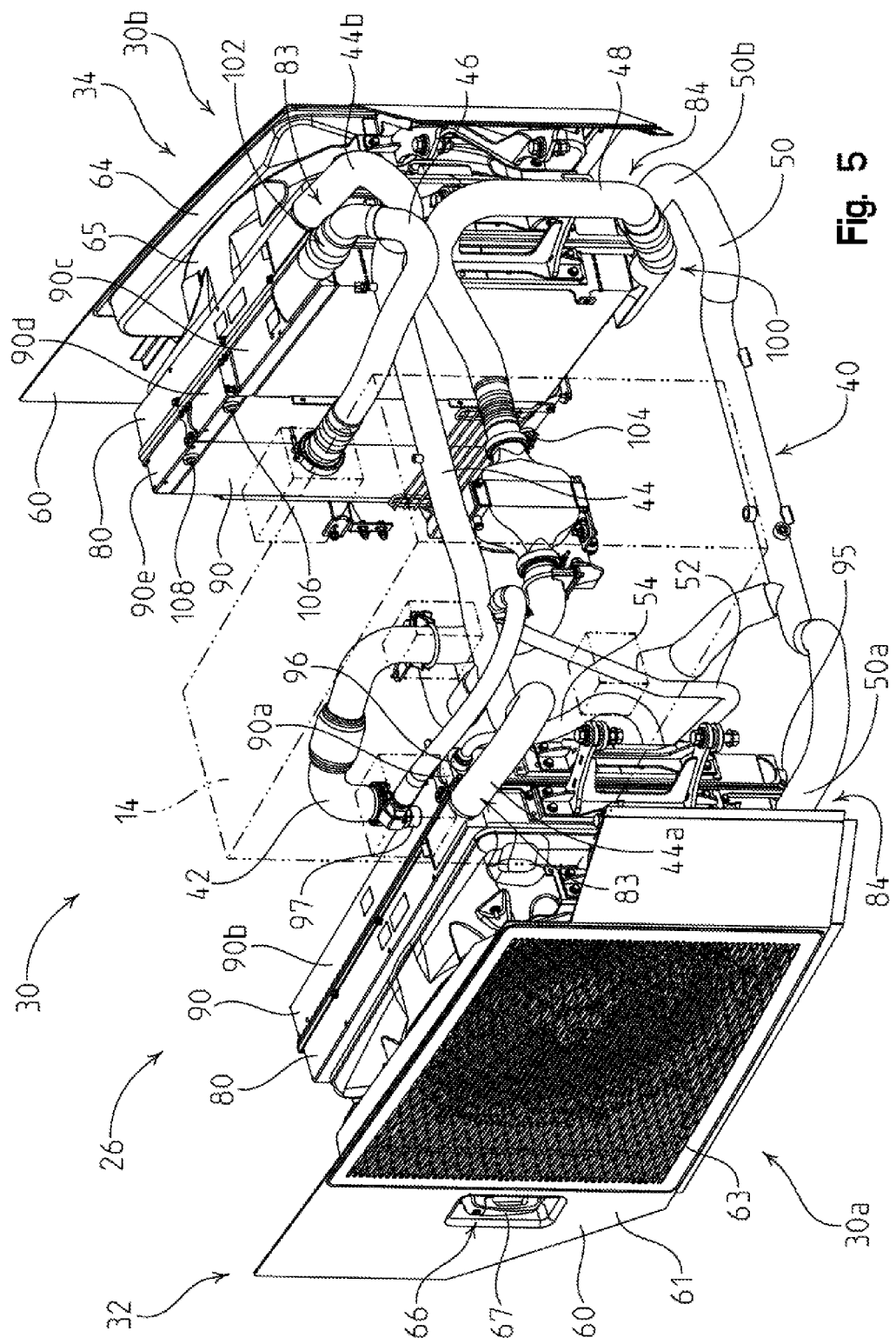
FIG. 5 is a front perspective view of the engine compartment of FIG. 3, including a plumbing assembly and the cooling system.

In FIG. 5, cooling system 30 is coupled to a plumbing assembly 40 in order to regulate the temperature of engine 14. As with other conventional vehicle plumbing assemblies, plumbing assembly 40 may include hoses, tubing, fluid lines, pipes, pumps, controls, monitors, and/or sensors to regulate the flow and temperature of fluids within engine compartment 26. Illustratively, plumbing assembly 40 includes a plurality of hoses 42, 44, 46, 48, 50, 52, and 54 coupled to cooling assemblies 30a, 30b. Hoses 42, 44, 46, 48, 50, 52, and 54 may be comprised of a flexible material for transporting the fluids (e.g., coolant, hydraulic oil, transmission oil, and/or turbo-charged air) between cooling assemblies 30a, 30b and the transmission, a hydraulic pump (not shown), and/or engine 14 during operation of dump truck 10.

Figure 6:
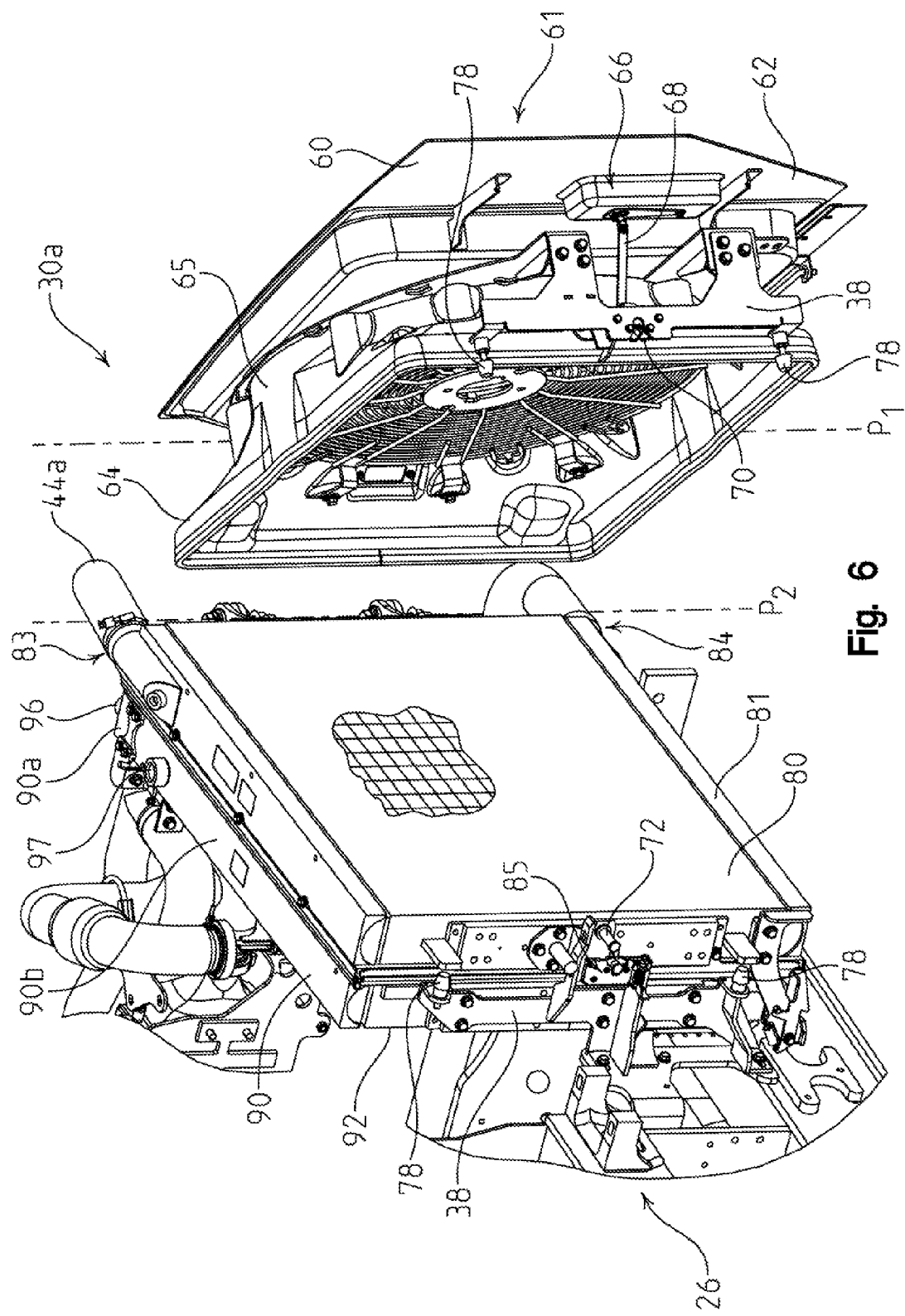
FIG. 6 is a rear perspective view of one side of the engine compartment of FIG. 3 having a door pivoted open.

Referring to FIGS. 4 and 6, cooling assembly 30a is shown having door 60 and fan 64 pivoted away from outer panel 80. Door 60 has an outer side 61 and an inner side 62. Door 60 further includes a vented portion 63 extending between outer side 61 and inner side 62, which allows air to flow through door 60 between cooling assembly 30a and the outside environment. Fan 64 further assists the flow of air between cooling assembly 30a and the outside environment. Fan 64 is coupled to inner side 62 of door 60 using conventional fasteners or couplers, such as bolts, screws, welds, rivets, or adhesive. Tools (e.g., wrenches) may be necessary to remove fan 64 from door 60. Alternatively, fan 64 may be removably coupled to door 60 using known tool-less, or hand-operable, couplers (e.g., gate clips, clamps), thereby eliminating the need for tools to remove, or uncouple, fan 64 from door 60.

While the exemplary embodiment of the air propelling mechanism is fan 64, other blowers, vent systems, or air flow devices known in the industry may be used.

Figure 7:
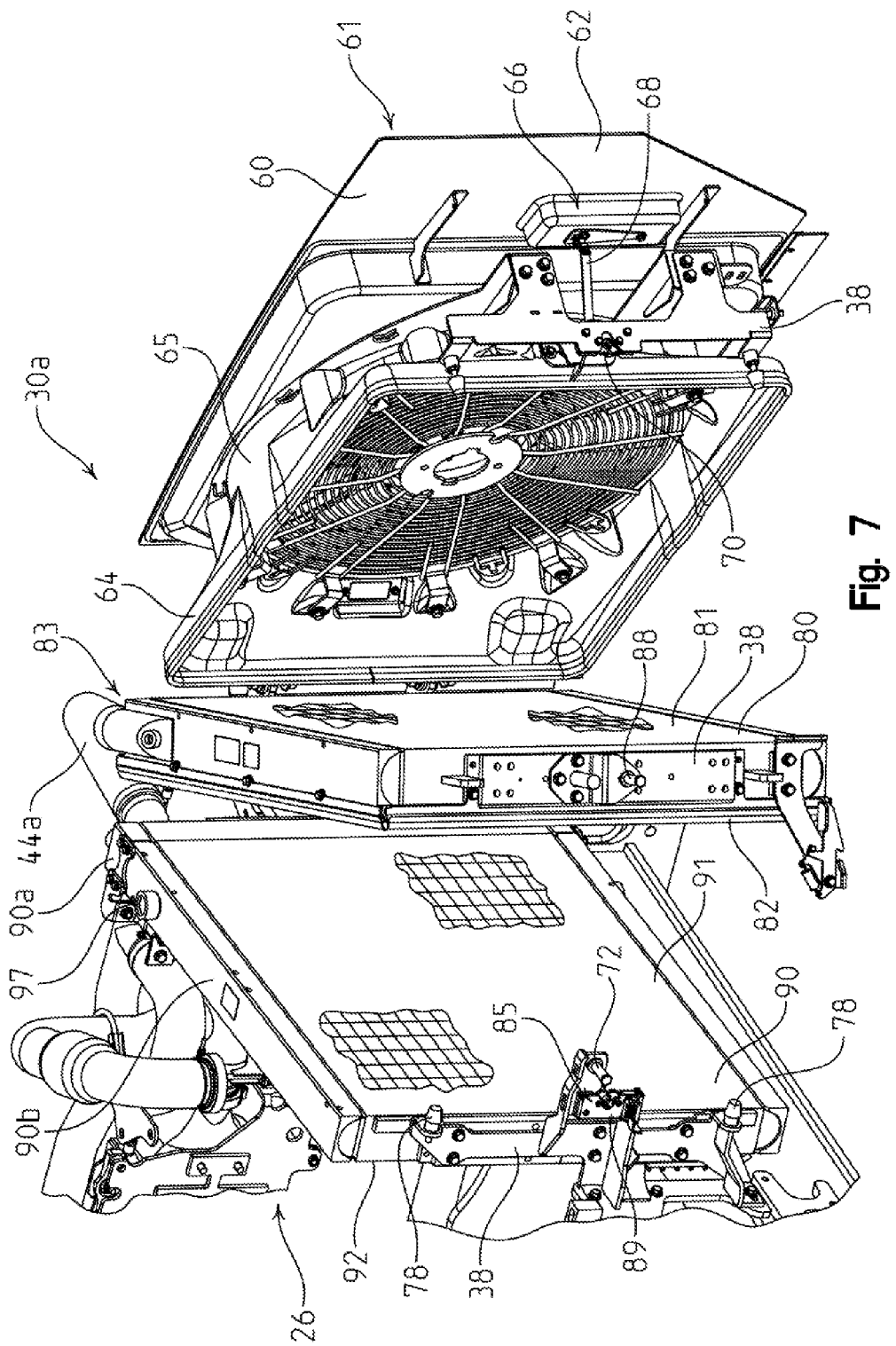
FIG. 7 is a rear perspective view of the one side of the engine compartment of FIG. 6 having the door and a first panel pivoted open.

Referring to FIGS. 5-7, adjacent to door 60 and fan 64 is outer cooling panel 80 having an outer side 81 and an inner side 82. Each outer cooling panel 80 may be vented with air passageways like door 60 to accommodate air flow through outer cooling panel 80. Illustratively, fan 64 is intermediate outer side 81 of outer panel 80 and door 60. Outer panel 80 embodies a heat exchanging mechanism configured to cooperate with hoses 44 and 50 of plumbing assembly 40. Illustratively, outer panel 80 of cooling assembly 30*a* includes an inlet 83 and an outlet 84 in fluid communication with hoses 44 and 50, respectively, to cool engine coolant in order to prevent engine 14 from overheating. Inlet 83 may be positioned above outlet 84 along a side edge of outer panel 80 in order to couple with a first end 44*a* of hose 44. Likewise, outlet 84 is positioned near a first end 50*a* of hose 50. First hose ends 44*a* and 50*a* may be coupled to inlet 83 and outlet 84, respectively, with conventional couplers (e.g., fasteners, clamps, clips, hose fittings, adhesive). At the opposite side of engine compartment 26, outer panel 80 of cooling assembly 30*b* mirrors outer panel 80 of cooling assembly 30*a* and also includes an inlet 83 and an outlet 84 for receiving, cooling, and transporting engine coolant. FIG. 5 shows inlet 83 fluidly coupled with a second end 44*b* of hose 44 and outlet 84 fluidly coupled with a second end 50*b* of hose 50. As with outer panel 80 of cooling assembly 30*a*, conventional couplers may be used to couple second hose ends 44*b* and 50*b* with inlet 83 and outlet 84, respectively. Outer panel 80 of each cooling assembly 30*a*, 30*b* may include an arrangement of tubes or passageways through which the fluids may travel in order to transfer heat from the fluid to cooling assemblies 30*a*, 30*b*, thereby reducing the temperature of the fluid. Each outer panel 80 may be any conventional cooling panel or cooling mechanism, for example, a radiator.

Figure 9A:
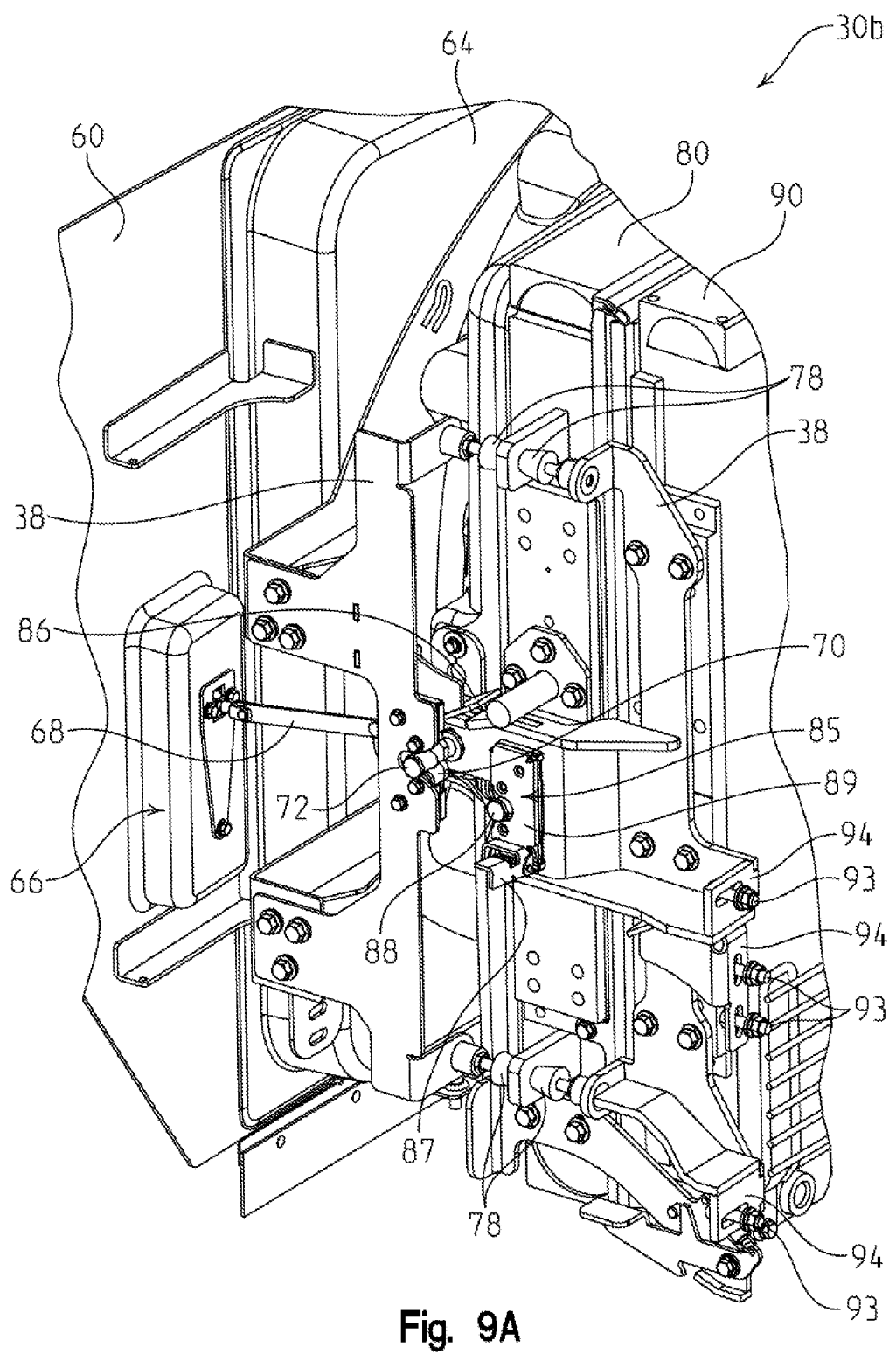
FIG. 9A is a side perspective view of a latch assembly of one side of the cooling system, shown in a closed position.

Referring to FIGS. 4 and 9A, inner panel 90, having an outer side 91 and an inner side 92, is positioned adjacent to engine 14 and is coupled to the frame of engine compartment 26. Frame assembly 38 of cooling system 30 may include a plurality of tabs 94 configured to cooperate with a plurality of bolts 93 to couple inner panel 90 with engine compartment 26. Tabs 94 may be any conventional support, projection, or coupler configured to couple inner cooling panel 90 to the frame of engine compartment 26. Likewise, bolts 93 may be any conventional coupler appropriate for coupling inner cooling panel 90 to the frame of engine compartment 26 (e.g., screws, pins, or fasteners).

As with outer panel 80, inner panel 90 of each cooling assembly 30*a*, 30*b* exemplifies a heat exchanger and may include a series of tubes or passageways through which the fluids may pass in order to transfer heat from the fluids to inner panel 90. Additionally, each inner cooling panel 90 may be vented with air passageways like outer cooling panel 80 and door 60 to accommodate air flow through inner cooling panel 90. As such, inner panel 90 is configured to decrease the temperature of the fluids. For example, inner panel 90 operates as a conventional vehicle radiator to prevent engine 14 from overheating.

As is shown in FIG. 5, inner cooling panel 90 of cooling assembly 30*a* is fluidly coupled to plumbing assembly 40 through hoses 52 and 54. Inner panel 90 of cooling assembly 30*a* may be divided into one or more compartments or chambers, each receiving a distinct fluid for cooling engine 14 or another component of dump truck 10. Each chamber includes an inlet and an outlet for transporting engine cooling fluid, transmission oil, hydraulic oil, axle oil, and/or turbo-charged air. Illustratively, inner cooling panel 90 of cooling assembly 30*a* is vertically divided into a first chamber 90*a* and a second chamber 90*b*. First chamber 90*a* includes an inlet 95 positioned along a bottom surface of chamber 90*a* and an outlet 96 positioned along a top surface of chamber 90*a*. A hydraulic line (not shown) is coupled to inlet 95 to transport hydraulic oil to chamber 90*a*. Hose 54 is in fluid communication with outlet 96 to receive and transport hydraulic oil after the oil has been cooled by chamber 90*a*.

Additionally, chamber 90*b* includes an inlet 97 positioned along top surface of chamber 90*b* and an outlet 98 positioned along a bottom surface of chamber 90*b* (FIG. 4). Hose 52 is in fluid communication with inlet 97 to receive and cool transmission oil. Outlet 98 is coupled to a transmission line (not shown) for transporting transmission oil to the transmission after the oil has been cooled in chamber 90*b*. Hoses 52, 54, the hydraulic lines, and the transmission line may be coupled to inlets 95, 97 and outlets 96, 98 of chambers 90*a*, 90*b* with conventional couplers (e.g., fasteners, clamps, clips, hose fittings, adhesive).

In comparison, FIG. 5 shows inner panel 90 of cooling assembly 30*b* having a first chamber 90*c*, a second chamber 90*d*, and a third chamber 90*e*. Illustratively, inner panel 90 of cooling assembly 30*b* is vertically divided into chambers 90*c*, 90*d*, 90*e*, each receiving a distinct fluid for cooling engine 14 or another component of dump truck 10. Chamber 90*c* includes an inlet 102 in fluid communication with hose 46 and an outlet 100 in fluid communication with hose 48. Hoses 46, 48 transport turbo-charged air, such that chamber 90*c* receives turbo-charged air through inlet 102 and outputs the air through outlet 100 in order to cool engine 14. The air is cooled by chamber 90*c* before entering hose 48. Hoses 46, 48 are coupled to inlet 102 and outlet 100, respectively, with conventional couplers.

Second chamber 90*d* of inner panel 90 of cooling assembly 30*b* includes an inlet 104 and an outlet 106 for cooling axle oil. Inlet 104 and outlet 106 are positioned along inner side 92 of inner panel 90 and are coupled to a plurality of axle lines (not shown). Inlet 104 is positioned near a bottom surface of chamber 90*d* and outlet 106 is positioned near a top surface of chamber 90*d*. Chamber 90*d* receives axle oil through inlet 104, cools the oil, and outputs the oil through outlet 106. Similarly, chamber 90*e* includes an inlet (not shown) and an outlet 108 for cooling and transporting axle oil. The inlet and outlet 108 of chamber 90*e* are positioned along inner side 92 of inner panel 90 and are coupled to a plurality of axle lines (not shown). The inlet is positioned near a bottom surface of chamber 90*e* and outlet 108 is positioned near a top surface of chamber 90*e*. The axle lines of chambers 90*d*, 90*e* may be coupled to the inlets and the outlets with conventional couplers.

Additionally, other chambers or compartments (not shown) may be coupled to inner panel 90 of each cooling assembly 30*a*, 30*b*. For example, additional chambers may receive air-conditioning refrigerant or diesel fuel. These other chambers may be coupled to inner side 92 of inner panel 90 or may be coupled to the frame of engine compartment 26 and/or chassis 12 with conventional couplers (i.e., bolts, rivets). Any additional chambers coupled to engine compartment 26 and/or chassis 12 do not hinder access to engine 14.

Figure 8:
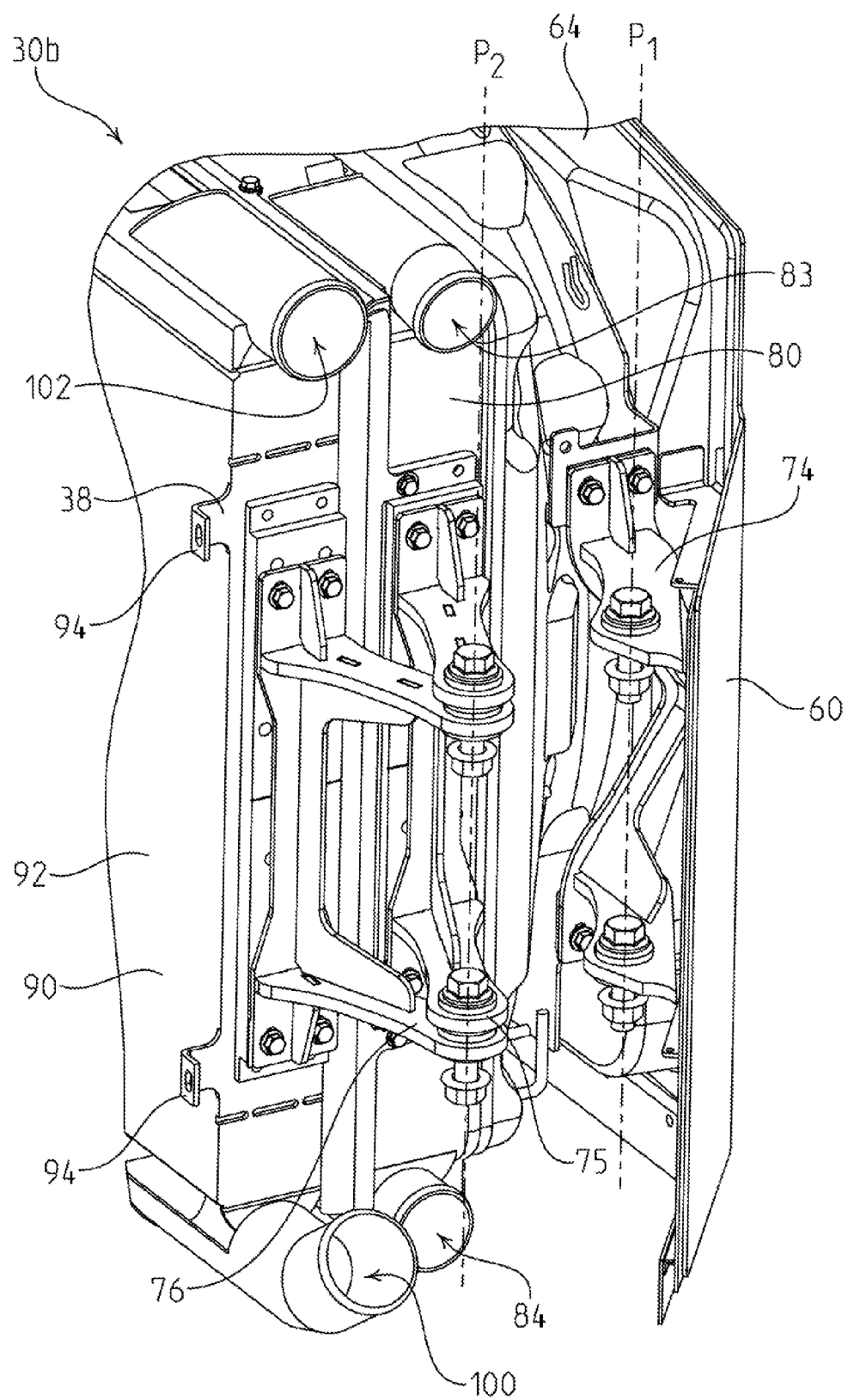
FIG. 8 is a front perspective view of a hinge assembly of one side of the cooling system.

Referring to FIGS. 3 and 8, door 60, including fan 64, is pivotally coupled to the support members of engine compartment 26 by a first hinge 74. First hinge 74 is positioned along door 60 near front side 28 of engine compartment 26. Door 60 is able to swing or pivot about a vertical axis $P_1$ on first hinge 74 between an "open" position and a "closed" position. Door 60 may pivot up to approximately 45° from engine compartment 26. When door 60 is coupled to outer panel 80 and inner panel 90, door 60 is in the closed position. Illustratively, door 60 is parallel with outer panel 80 in the closed position. Conversely, when door 60 is pivoted away from outer panel 80, door 60 is in the open position and fan 64 and outer side 81 of outer panel 80 are exposed.

Similarly, outer panel 80 includes a second hinge 75 coupled along a vertical side edge of outer panel 80 near front side 28 of engine compartment 26. Second hinge 75 is further coupled to the frame of engine compartment 26 and/or chassis 12. With second hinge 75, outer panel 80 may pivot about a vertical axis $P_2$ in a manner similar to door 60. Illustratively, vertical axis $P_2$ of second hinge 75 may be spaced apart from vertical axis $P_1$ of first hinge 74 and may be parallel to vertical axis $P_1$. Second hinge 75 allows outer panel 80 to pivot or rotate between a "closed" position and an "open" position. When outer panel 80 is parallel to inner panel 90 and inner panel 90 is coupled to engine compartment 26, outer panel 80 is in the closed position and only outer side 81 of outer panel 80 may be exposed (FIG. 6). Conversely, the open position is defined when outer panel 80 is pivoted away from inner panel 90. As such, sides 81, 82 of outer panel 80 and outer side 91 of inner panel 90 are exposed (FIG. 7). The exemplary embodiment of outer panel 80 may pivot up to approximately 20° away from inner panel 90. Furthermore, outer panel 80 pivots in the same direction as door 60.

Additionally, inner cooling panel 90 is configured to pivot on a third hinge 76 in the same manner that outer panel 80 pivots on second hinge 75. Third hinge 76 is coupled to a vertical side edge of inner panel 90 and engine compartment 26 and/or chassis 12 near front end 28 of engine compartment 26. As with outer panel 80, inner panel 90 may pivot outwardly from engine compartment 26 approximately 20° to expose inner side 92 and engine 14. In the illustrative embodiment of FIG. 8, inner panel 90 pivots about the same vertical axis $P_2$ as outer panel 80. Inner panel 90 pivots about vertical axis $P_2$ between a "closed" position, when inner panel 90 is coupled to engine compartment 26, and an "open" position, when inner panel 90 is uncoupled from engine compartment 26. Inner panel 90 follows the same pivot direction as outer panel 80 and door 60 when pivoting to the open position.

Figure 9B:
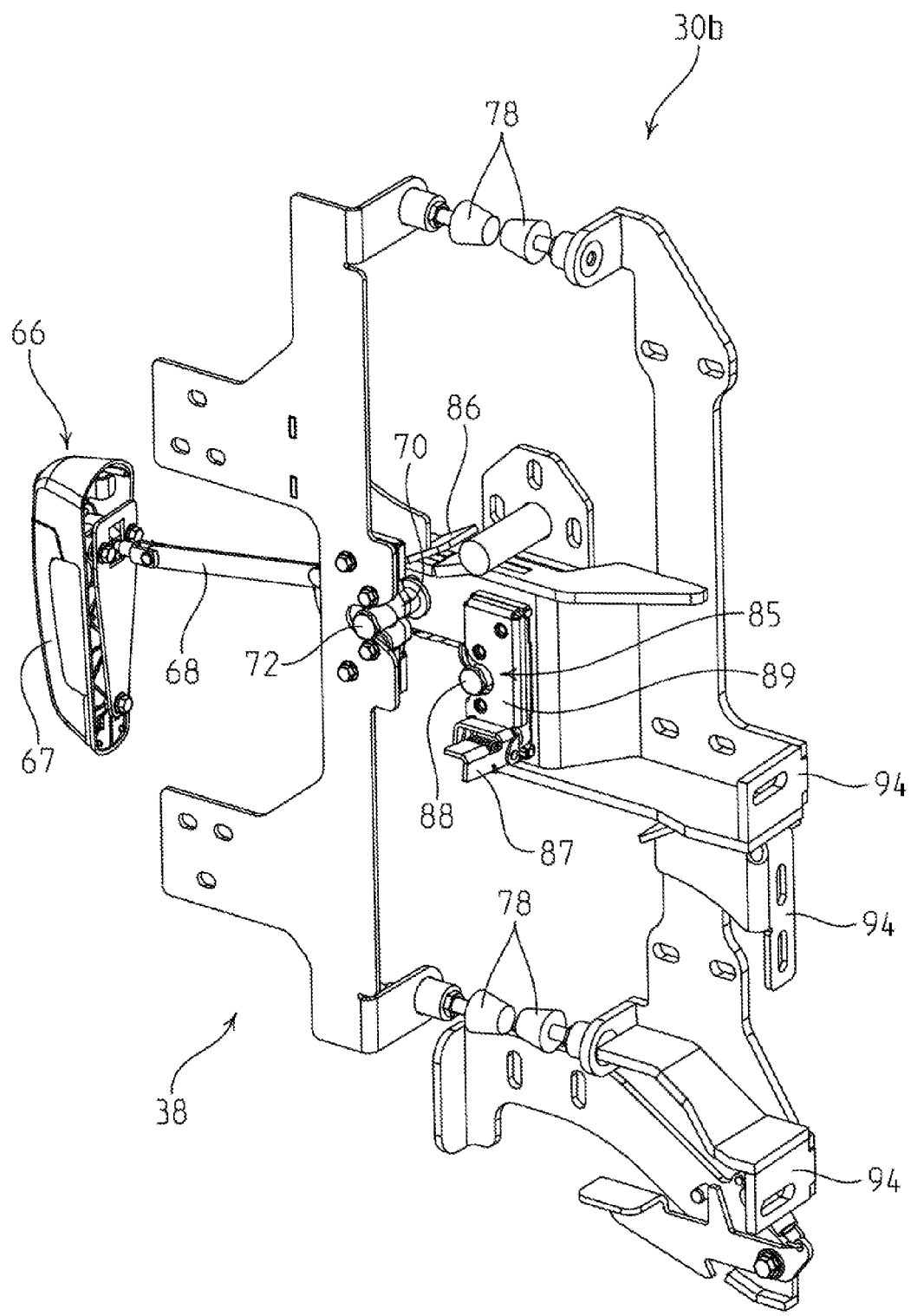
FIG. 9B is another side perspective view of the latch assembly of FIG. 9A, shown without the cooling system.
Figure 9C:
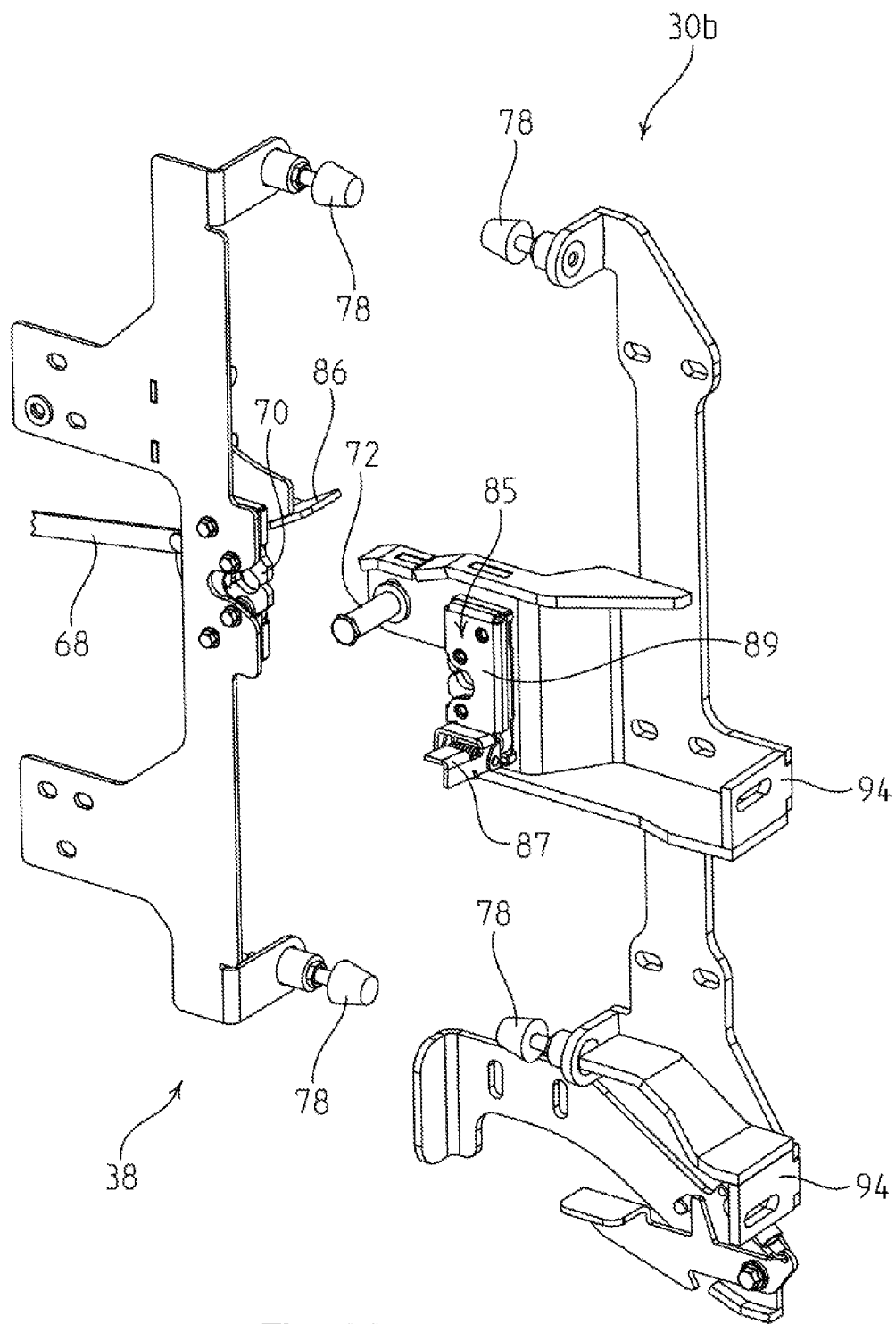
FIG. 9C is a further side perspective view of the latch assembly of FIG. 9B, shown in an open position.

As is shown in FIGS. 9A-9C, door 60 includes a coupler, illustratively a door latch assembly 66, configured to releasably attach door 60 to outer panel 80 and inner panel 90. Door latch assembly 66 extends between outer side 61 and inner side 62 of door 60 and is coupled along a side of door 60 opposite to first hinge 74. Door latch assembly 66 includes a handle 67, a stem 68, a clamp 70, and a lug 72 operably coupled to frame assembly 38 of cooling system 30. Illustratively, actuating handle 67 (e.g., rotating, pulling) triggers a spring mechanism (not shown) to open and close clamp 70 around lug 72, which is coupled to inner panel 90. Door latch assembly 66 may be hand-operated and, as such, the operator is not required to use tools to operate latch assembly 66 in order to uncouple door 60 from outer panel 80 and inner panel 90. Alternatively, door latch assembly 66, including handle 67, stem 68, and clamp 70 may be any conventional, hand-operable latch assembly or coupling device, allowing the operator to open and close door 60 without tools. When door 60 is released from lug 72 of inner panel 90 using door latch assembly 66 (FIG. 9C), door 60 may vertically pivot to the open position on first hinge 74 about vertical axis $P_1$ to expose fan 64 and outer side 81 of outer panel 80. When door 60 is pivoted to the closed position, a plurality of bumpers 78 may be used to soften the closure and prevent door 60 from being closed against outer panel 80 with excess force. Illustratively, bumpers 78 are comprised of a rubber material coupled to frame assembly 38.

Outer panel 80 also includes a coupler, illustratively a latch assembly 85, configured to releasably attach outer panel 80 to inner panel 90. Latch assembly 85 is coupled to frame assembly 38 of cooling system 30 and uses a spring mechanism (not shown) to open and close a clamp 89 around a lug 88. A handle, push button, lever, or other known latching device may be included in latch assembly 85 in order to uncouple outer panel 80 from inner panel 90. Illustratively, latch assembly 85 includes a lever 87 that may be used to open the spring mechanism of clamp 89 and release lug 88, thereby uncoupling outer panel 80 from inner panel 90. Alternatively, lever 87 may be a handle on which the operator pulls such that the pulling force may open clamp 89 and release lug 88 to uncouple outer panel 80 from inner panel 90. When it is necessary to couple outer panel 80 with inner panel 90, lever 87 may be used or outer panel 80 may be pushed toward inner panel 90 with sufficient force to open clamp 89 and receive lug 88. A stop 86 may assist the operator when latching outer panel 80 to inner panel 90 by preventing outer panel 80 from contacting inner panel 90 with excess force. Additionally, bumpers 78 may be used to further soften the closure of outer panel 80 against inner panel 90. As with door latch assembly 66, latch assembly 85 also operates by hand and does not require tools to uncouple outer panel 80 from inner panel 90. Latch assembly 85, including lever 87, lug 88, and clamp 89, may be any conventional, hand-operable latch or coupling device configured to releasably couple outer panel 80 and inner panel 90.

Cooling panels 80, 90 may pivot together when coupled together with latch assembly 85 or may pivot independently of each other when clamp 89 releases lug 88 to uncouple outer panel 80 from inner panel 90. If cooling panels 80, 90 pivot together on hinges 75, 76, respectively, about vertical axis $P_2$, only outer side 81 of outer panel 80, inner side 92 of inner panel 90, and engine 14 are exposed. Inner side 82 of outer panel 80 and outer side 91 of inner panel 90 are not visible. Conversely, if latch assembly 85 releases outer panel 80 from inner panel 90, outer panel 80 may pivot open to expose both of sides 81, 82 of outer panel 80 and inner panel 90 may pivot open to expose both of sides 91, 92 of inner panel 90 and engine 14.

Figure 10:
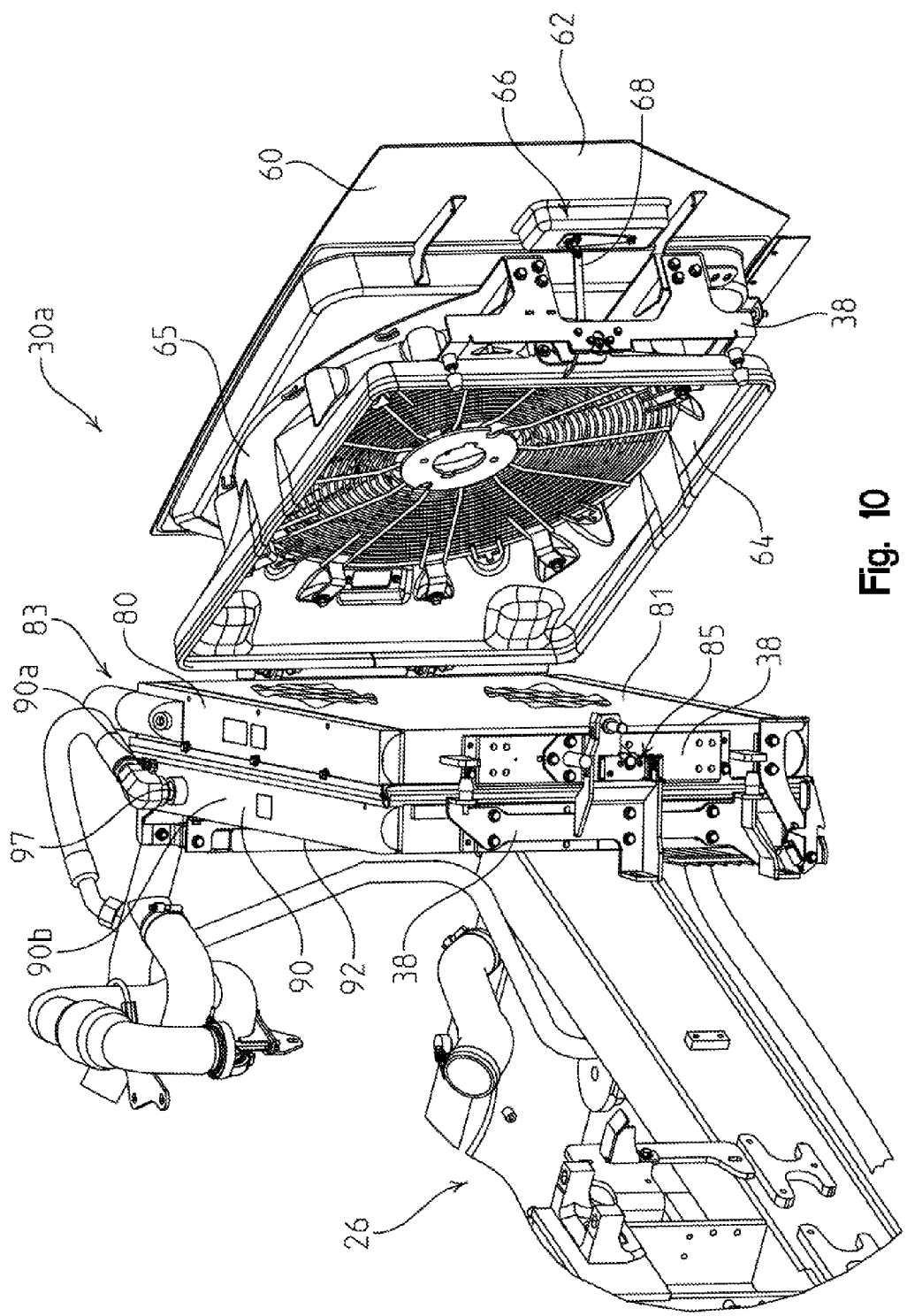
FIG. 10 is a rear perspective view of one side of the engine compartment of FIG. 3 having the door, the first panel, and a second panel pivoted open.

With reference to FIGS. 6, 7, and 10, in operation, when it is necessary to clean, repair, or maintain cooling system 30, engine compartment 26, or engine 14, the operator may vertically pivot at least a portion of cooling assembly 30 to the "open" position. Specifically, door 60 may be uncoupled from outer panel 80 with door latch assembly 66 in order to pivot door 60 from the closed position to the open position about vertical axis $P_1$. The operator may operate handle 67 of door latch assembly 66 by hand (e.g., pulling handle 67) to release lug 72 from clamp 70. With door 60 released from outer panel 80, first hinge 74 of door 60 may pivot about vertical axis $P_1$ to expose inner side 62 of door 60, fan 64, and outer side 81 of outer panel 80 for cleaning or repair. If it is necessary to clean or maintain inner side 82 of outer panel 80 or outer side 91 of inner panel 90, outer panel 80 may be uncoupled from inner panel 90 using latch assembly 85. The illustrative embodiment of latch assembly 85 may be operated by hand, rather than with tools, to release lug 88 from clamp 89. For example, the operator may actuate lever 87 (e.g., depress, pull, rotate) to overcome the spring force of clamp 89, thereby releasing lug 88 and uncoupling outer panel 80 from inner panel 90. When outer panel 80 is uncoupled from inner panel 90, second hinge 75 of outer panel 80 may pivot about vertical axis $P_2$ from the closed position to the open position.

Furthermore, if it is required to access inner side 92 of inner panel 90, engine 14, or engine compartment 26, inner panel 90 may be uncoupled from engine compartment 26 by removing bolts 93 from tabs 94. Third hinge 76 of inner panel 90 may pivot about vertical axis $P_2$ to the open position.

If it is only necessary to access inner side 92 of inner panel 90, engine 14, or engine compartment 26, outer panel 80 may remain coupled to inner panel 90 with latch assembly 85 and both cooling panels 80, 90 may pivot together between the closed and open positions about vertical axis $P_2$. Illustratively, clamp 89 of latch assembly 85 remains coupled to lug 88 while inner panel 90 is uncoupled from engine compartment 26. Bolts 93 are removed from tabs 94 so that third hinge 76 of inner panel 90 and second hinge 75 of outer panel 80 pivot about vertical axis $P_2$. In this embodiment, outer panel 80 coupled with inner panel 90 may still pivot vertically up to approximately 20°. Also, by vertically pivoting door 60 and cooling panels 80, 90 away from engine compartment 26, the operator does not need to reach over cooling assemblies 30a, 30b to access engine 14.

Hoses 42, 44, 46, 48, 50, 52, and 54, the transmission lines, and the axle lines may remain coupled to cooling system 30 when outer panel 80 and inner panel 90 pivot about vertical axis $P_2$. As such, the fluids do not need to be drained from cooling assembly 30 prior to pivoting cooling panels 80, 90. Additionally, the flexible nature of hoses 42, 44, 46, 48, 50, 52, and 54, the transmission lines, and the axle lines minimizes any frictional resistance at the inlets and the outlets when outer panel 80 and inner panel 90 are opened. Illustratively, hoses 42, 44, 50, 52, and 54 remain coupled to cooling system 30 as cooling panels 80, 90 pivot between the open and closed positions. While the illustrative embodiment of hoses 46, 48 may be uncoupled from inner panel 90 of cooling assembly 30b when inner panel 90 pivots between the open and closed positions, alternative embodiments of hoses 46, 48 may remain coupled to inner panel 90 of cooling assembly 30b during such pivoting motion. As is described, turbocharged air flows through exemplary hoses 46, 48, and therefore, no fluid needs to be drained from hoses 46, 48 to pivot inner panel 90 of cooling assembly 30b about vertical axis $P_2$.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A vehicle including: a chassis; a plurality of ground-engaging members operably coupled to the chassis; an engine supported by the chassis and cooperating with the plurality of ground-engaging members to move the vehicle; and at least one cooling assembly positioned adjacent to the engine, the at least one cooling assembly including at least one cooling panel that is configured to receive a fluid and at least one fan that is configured to pivot outwardly relative to the at least one cooling panel about a first substantially vertical axis, the at least one cooling panel being configured to pivot outwardly relative to the engine about a second substantially vertical axis to expose the engine.

2. The vehicle of claim 1, wherein the at least one cooling panel is removably coupled to the at least one fan with a hand-operable coupler.

3. The vehicle of claim 1, wherein the at least one cooling panel includes a first cooling panel and a second cooling panel, the first cooling panel being positioned adjacent to the at least one fan and the second cooling panel being positioned adjacent to the engine.

4. The vehicle of claim 3, wherein the first and second cooling panels are arranged in a parallel configuration such that the first cooling panel is intermediate the second cooling panel and the at least one fan.

5. The vehicle of claim 4, wherein the first and second cooling panels are arranged in a stacked configuration such that a top surface of the first cooling panel is directly adjacent a top surface of the second cooling panel, and the top surfaces of the first and second cooling panels define a generally continuous surface.

6. The vehicle of claim 3, wherein the first and second cooling panels pivot outwardly about the second substantially vertical axis.

7. The vehicle of claim 3, wherein the first cooling panel is releasably coupled to the second cooling panel with a hand-operable coupler, the first cooling panel being configured to pivot away from the second cooling panel to expose an outer surface of the second cooling panel.

8. The vehicle of claim 1, wherein the vehicle is a dump truck.

9. The vehicle of claim 1, wherein the fan being is configured to pivot in an outward direction relative to the at least one cooling panel, and the at least one cooling panel is configured to pivot in the outward direction of the fan.

10. The vehicle of claim 1, wherein the first substantially vertical axis is spaced apart from the second substantially vertical axis.

11. A vehicle including: a chassis; a plurality of ground-engaging members operably coupled to the chassis; an engine compartment coupled to the chassis and housing an engine; and at least one cooling assembly coupled to the engine compartment, the cooling assembly including an air propelling member, a first cooler; and a second cooler, the first and second cooler configured to receive a fluid, the second cooler being intermediate the first cooler and the engine, the air propelling member being pivotable from a closed position to an open position about a substantially vertical axis, the first cooler being pivotable from a closed position to an open position about a substantially vertical axis, and the second cooler being pivotable from a closed position to an open position about a substantially vertical axis, the first cooler being intermediate the second cooler and the air propelling member when in the closed position, the air propelling member configured to pivot relative to the first cooler.

12. The vehicle of claim 11, wherein the first cooler is configured to pivot relative to the second cooler and the air propelling member, and the second cooler is configured to pivot relative to the engine and the first cooler.

13. The vehicle of claim 11, wherein the air propelling member is parallel to the first and second coolers and the first cooler is parallel to the second cooler.

14. The vehicle of claim 11, wherein the air propelling member pivots away from the first cooler about a first substantially vertical axis and the first cooler pivots away from the second cooler about a second substantially vertical axis that is spaced apart from the first substantially vertical axis.

15. The vehicle of claim 11, wherein the air propelling member pivots up to 45 degrees between the closed position and the open position.

16. The vehicle of claim 11, wherein the first and second coolers each pivot up to 20 degrees between the closed position and the open position.

17. The vehicle of claim 11, further comprising a first hand-operable coupler configured to removably couple the air propelling member with the first cooler and a second hand-operable coupler configured to removably couple the first cooler with the second cooler.

18. The vehicle of claim 11, wherein the substantially vertical axes of the first cooler and second cooler are coincident.

19. A vehicle including: a chassis; a plurality of ground-engaging members operably coupled to the chassis; an engine compartment coupled to the chassis and housing an engine; and at least one cooling assembly coupled to the engine compartment, the cooling assembly including: an air propelling member configured to draw a flow of air toward the engine compartment, the air propelling member pivotable from a closed position to an open position about a first axis: a first cooler having an inner side and an outer side, the outer side being adjacent the air propelling member in a direction of the flow of air, the first cooler pivotable from a closed position to an open position about a second axis; and a second cooler having an inner side adjacent the engine compartment and an outer side adjacent the inner side of the first cooler in the direction of the flow of air, the second cooler being pivotable from a closed position to an open position about a third axis, the first axis, the second axis and the third axis substantially parallel.

20. The vehicle of claim 19, wherein the air propelling member is parallel to the first and second coolers, and the first cooler is parallel to the second cooler.

21. The vehicle of claim 19, wherein the first axis comprises a first substantially vertical axis and the second axis comprises a second substantially vertical axis, the air propelling member pivots away from the first cooler about the first substantially vertical axis and the first cooler pivots away from the second cooler about the second substantially vertical axis that is spaced apart from the first substantially vertical axis.

22. The vehicle of claim 19, further comprising a first hand-operable coupler configured to removably couple the air propelling member with the first cooler and a second hand-operable coupler configured to removably couple the first cooler with the second cooler.

23. The vehicle of claim 19, wherein the first axis of the air propelling member is spaced apart from the second and third axes.

24. The vehicle of claim 19, wherein the second and third axes are coincident.

* * * * *